UNITED STATES PATENT OFFICE.

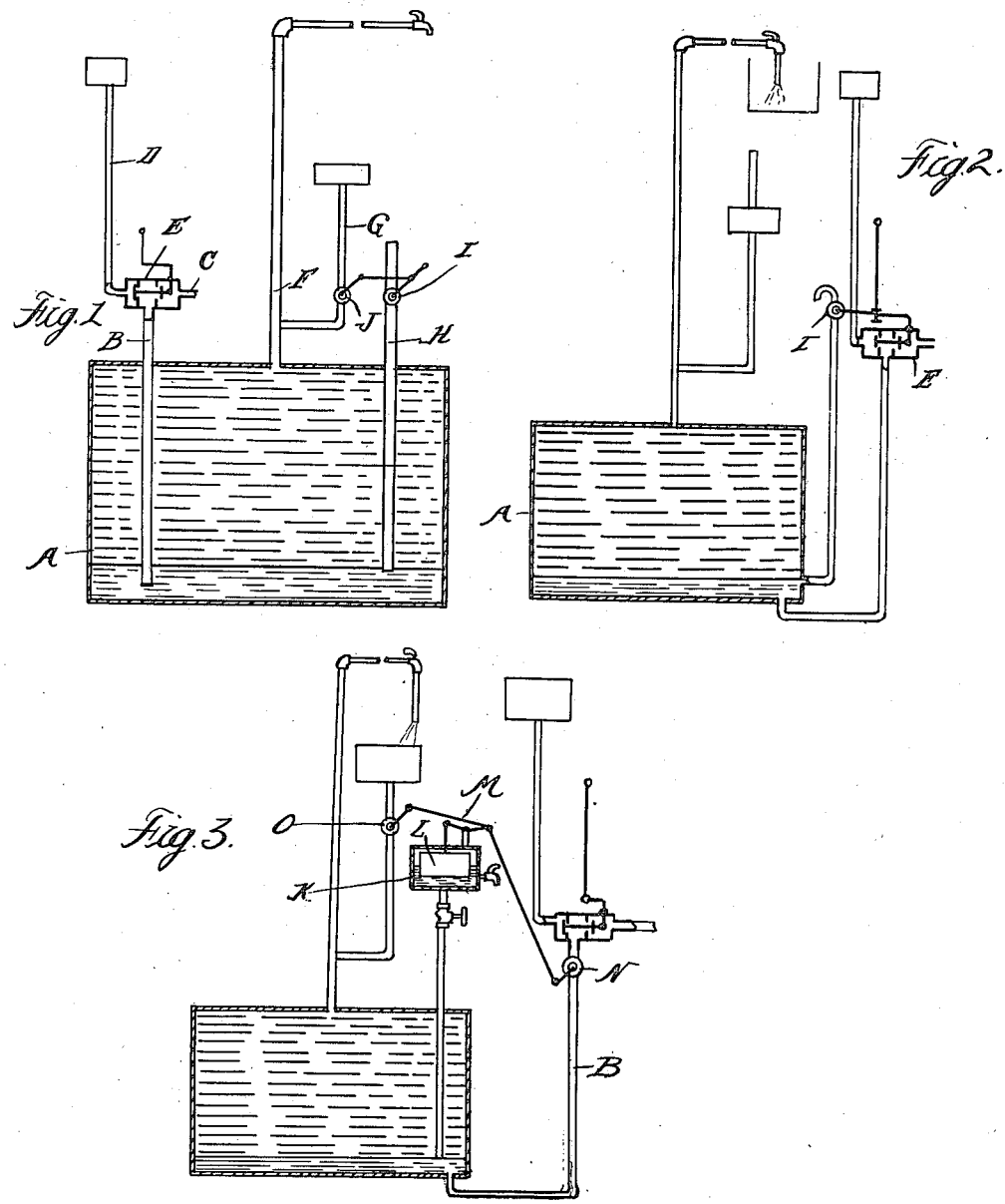

FREDERICK G. FARR, OF DETROIT, MICHIGAN, ASSIGNOR TO HYDRAULIC OIL SYSTEMS CORPORATION, OF DETROIT, MICHIGAN, A CORPORATION OF MICHIGAN.

HYDRAULIC STORAGE AND DELIVERY SYSTEM.

1,286,975. Specification of Letters Patent. Patented Dec. 10, 1918.

Application filed January 19, 1918. Serial No. 212,627.

*To all whom it may concern:*

Be it known that I, FREDERICK G. FARR, a citizen of the United States of America, residing at Detroit, in the county of Wayne and State of Michigan, have invented certain new and useful Improvements in Hydraulic Storage and Delivery Systems, of which the following is a specification, reference being had therein to the accompanying drawings.

The invention relates to hydraulic oil storage and delivery systems of that type in which there is a normally open displacement connection with a sewer or drain, through which the water is displaced during the filling of the tank with oil. When oil is to be delivered the drain connection is first closed and a connection opened from a higher head sufficient to deliver the oil. The normal condition of the system is, however, with the drain connection open, which permits of refilling the system with oil.

It is very important to prevent the displacement of oil through this drain connection due to the over-filling of the system, and various devices have been devised for this purpose. One construction is the placing of a trap in the displacement conduit leading to the drain, but this involves difficulties in construction, particularly where the tank is first placed in the ground for a non-hydraulic system and is afterward converted into a hydraulic system. The present invention dispenses with the necessity of such a trap, and also has other advantages as hereinafter set forth.

In the drawings:

Figure 1 is a diagrammatic view of a hydraulic system embodying my invention;

Fig. 2 is a similar view of a modified construction; and

Fig. 3 is a similar view showing still another modification.

A is a storage tank, B is a conduit connecting to the bottom or lower end of the tank and leading to the drain C. D is a water supply connection from a greater head and E is a controlling valve for closing the drain and opening the high head connection D, or for closing said high head connection and opening the drain. F is the oil-delivery conduit connected with the top of the tank, and G is a fill connection through which the oil may be introduced. It is well understood that the static head of the oil is higher than that of a balancing column of water, and it is usual to locate the oil fill connection at such an elevation that the oil will overflow before the water is completely forced from the tank. Where there is a trap of sufficient depth in the water displacement connection this will avoid danger of completely displacing the water and allowing the oil to flow into the drain, but without such a trap there is danger of such a result. Moreover the filling of the tank is sometimes effected by directly coupling the filling pipe with a discharge hose from the tank or wagon, which will place upon the storage tank a greater than normal head and may result in overfilling the tank and discharging oil into the sewer. This result I prevent by connecting to the storage tank a conduit H having its lower end located at the lowest point to which the oil may be safely forced in the storage tank A, while the upper end of this conduit is at a level between that of the static head of oil and the static head of water,—or, in other words, between the level of the water displacement connection and the level of a corresponding weight of oil. Normally the conduit H is connected with the water in the tank and is itself filled with the water, but if at any time the oil in the tank is forced downward below the lower end of the conduit H oil will displace the water in said conduit and will rise to overflow the top thereof. Thus where the conduit H is open overfilling of the tank is effectually prevented, for the forcing of the oil below the lower end of the conduit H will displace the water in said conduit and permit the oil to flow outward therethrough. This will relieve the pressure, and inasmuch as the level of the top of the conduit H is lower than the oil head corresponding to the water head of the drain conduit C, it is impossible to force any oil into said drain. Wasting of oil may be prevented either by having the discharge end of the conduit H where it may be observed by the operator, or by connecting it with mechanism for automatically stopping the further filling of the oil.

It is obvious that the conduit H must be closed whenever a higher head is placed on the system for the delivery of oil, and for this purpose a valve I is employed. This valve may be manually operated, but there is danger that the operator might forget to open the valve when the system is to be refilled, which would prevent the conduit H from functioning. I therefore preferably employ a construction in which it is impossible to fill the system without opening the valve I.

As shown in Fig. 1, the valve I is connected with a valve J for opening and closing the fill connection G, and the arrangement is such that whenever the connection G is opened the conduit H will also be opened. Consequently the operator is prevented from filling any oil into the system until he first opens the valve J, and this by automatically opening the valve I will permit of overflow through the conduit H before any oil can be forced into the drain. In the construction shown in Fig. 2 the valve I is connected with the valve E for closing and opening the drain C and for also controlling the opening and closing of the high head water connection D. With this arrangement it is evident that each time delivery of oil is effected the valve I is closed, but as soon as the valve E is manipulated to cut off the high head and open the drain connection the valve I will be opened to open the conduit H. This construction has an advantage over the construction shown in Fig. 1 in that it prevents the overfilling of the tank by oil from any source, whereas the construction shown in Fig. 1 will only prevent entrance of oil through the fill connection G. For instance if the discharge end of the delivery pipe F is immersed in a liquid in a receptacle which is being filled, the manipulation of the valve E to cut off the oil supply and open the drain connection will cause a siphoning of oil from said receptacle which may result in overfilling the tank and driving some of the oil into the drain. Such a result is, however, effectually prevented with the construction shown in Fig. 2, for the manipulation of the valve E to open the drain will also open the valve I and any siphoned oil will therefore discharge through the conduit H and not find its way into the sewer.

With the construction shown in Fig. 3, instead of leaving the upper end of the conduit H open to the atmosphere it is connected with a tank K in which is arranged a float L. This float will be lifted by the rise of oil into the tank K and will actuate a lever connection M, which in turn will operate a valve in either the conduit B or the fill connection G. As shown, there are two valves N and O, one in each of said connections.

With all of the modifications above described overfilling of the tank is prevented, the construction in Fig. 1 being non-automatic, that in Fig. 2 being partially automatic, while that in Fig. 3 is completely automatic.

What I claim as my invention is:

1. In a system for the hydraulic storage and delivery of oil, the combination with a tank, a fill connection therefor and a water discharge connection, of means for preventing displacement of oil into said water discharge connection, comprising a pipe having its lower end in unobstructed communication with the tank at a predetermined level, the upper end of said pipe being above the hydrostatic level of the water in said discharge connection and below the balancing hydrostatic level of oil.

2. In a system for the hydraulic storage and delivery of oil, the combination with a tank, a normally open low head water discharge connection and a normally closed high head connection, of means for closing said discharge connection upon the opening of said high head connection, a conduit having unobstructed communication with said tank at its lower end at a predetermined low level for the oil and its upper end being betwen the level of said low head discharge connection and the static level of oil corresponding to said low head, and a valve in said conduit for opening and closing the same.

3. In a system for the hydraulic storage and delivery of oil, the combination with a tank, a fill connection therefor, a normally open low head water discharge connection and normally closed high head water connection, of a conduit having its lower end connected to said tank at a predetermined low level for the oil and its upper end at a level above the level of the low head water discharge connection and below the corresponding hydrostatic level of oil, a valve for opening and closing said conduit, and means for automatically manipulating said valve by the change from said low head to said high head.

4. In a system for the hydraulic storage and delivery of oil, the combination with a tank, of a fill connection therefor, a water discharge connection in communication with the lower portion of said tank, and means for preventing displacement of oil into said water discharge connection comprising a pipe having its lower end in communication with said tank above the opening thereinto of said discharge connection and at a predetermined low level for the oil, the upper end of said pipe being above the hydrostatic level of the water in said discharge connection and below the balancing hydrostatic level of oil.

5. In a system for the hydraulic storage and delivery of oil, the combination with a tank, a fill connection therefor, a normally open low head water discharge connection and normally closed high head water connection, means for alternatively placing the high head water connection and low head discharge connection in communication wtih the tank, a conduit having its lower end in communication with the tank at a predetermined low level for the oil and having an outlet at a level above that of the low head water discharge connection and below the corresponding hydrostatic level of oil, a valve for opening and closing said conduit, and means for actuating said valve in common with the means controlling the high and low head water connections with the tank.

In testimony whereof I affix my signature.

FREDERICK G. FARR.